United States Patent
Kana et al.

(10) Patent No.: US 11,320,540 B2
(45) Date of Patent: May 3, 2022

(54) INTEGRITY MONITORING OF PRIMARY AND DERIVED PARAMETERS

(71) Applicant: Honeywell International s.r.o, Praha 4—Chodov (CZ)

(72) Inventors: Zdenek Kana, Dubnany (CZ); Mats Anders Brenner, Plymouth, MN (US); Pavol Malinak, Markusovce (SK); James Arthur McDonald, Minneapolis, MN (US)

(73) Assignee: Honeywell International Inc., Charlotte, NC (US)

( * ) Notice: Subject to any disclaimer, the term of this patent is extended or adjusted under 35 U.S.C. 154(b) by 444 days.

(21) Appl. No.: 16/380,901

(22) Filed: Apr. 10, 2019

(65) Prior Publication Data

US 2020/0326428 A1 Oct. 15, 2020

(51) Int. Cl.
*G01S 19/20* (2010.01)
*G01S 19/08* (2010.01)
(Continued)

(52) U.S. Cl.
CPC ............ *G01S 19/20* (2013.01); *G01S 19/08* (2013.01); *G01S 19/10* (2013.01); *G01S 19/23* (2013.01);
(Continued)

(58) Field of Classification Search
CPC .......... G01S 19/20; G01S 19/08; G01S 19/10; G01S 19/23; G01S 19/40; G01S 19/42; G01S 19/52; G01S 19/53
(Continued)

(56) References Cited

U.S. PATENT DOCUMENTS 5,760,737 A * 6/1998 Brenner ............... G01C 21/165
342/357.58
6,639,549 B2 * 10/2003 Vanderwerf ............ G01S 19/20
342/357.58
(Continued)

FOREIGN PATENT DOCUMENTS

EP 2081043 A2 7/2009

OTHER PUBLICATIONS

European Patent Office, "Extended European Search Report from U.S. Appl. No. 16/380,901, filed Sep. 9, 2020", from Foreign Counterpart to U.S. Appl. No. 16/380,901, filed Sep. 9, 2020, pp. 1 through 7, Published: EP.

*Primary Examiner* — Chuong P Nguyen
(74) *Attorney, Agent, or Firm* — Fogg & Powers LLC

(57) ABSTRACT

Systems and methods for integrity monitoring of primary and derived parameters are described herein. In certain embodiments, a method includes transforming an estimated error state covariance matrix of at least one primary integrity monitoring parameter of a navigation system onto an error state covariance matrix of one or more derived integrity monitoring parameters, wherein the one or more derived integrity monitoring parameters depends from the at least one primary integrity monitoring parameter. The method also includes transforming an integrity threshold of the at least one primary integrity monitoring parameter onto separation parameters of the one or more derived integrity monitoring parameters. The method further includes computing a protection limit for the one or more derived integrity monitoring parameters.

18 Claims, 4 Drawing Sheets

(51) Int. Cl.
*G01S 19/10* (2010.01)
*G01S 19/23* (2010.01)
*G01S 19/42* (2010.01)
*G01S 19/52* (2010.01)
*G01S 19/53* (2010.01)
*G01S 19/40* (2010.01)

(52) U.S. Cl.
CPC .............. *G01S 19/40* (2013.01); *G01S 19/42* (2013.01); *G01S 19/52* (2013.01); *G01S 19/53* (2013.01)

(58) Field of Classification Search
USPC ............ 342/357.58, 357.62, 357.45, 357.47, 342/357.23, 357.25, 357.35, 357.36; 701/3
See application file for complete search history.

(56) References Cited

U.S. PATENT DOCUMENTS

| | | | |
|---|---|---|---|
| 9,069,068 | B2 | 6/2015 | Webb et al. |
| 9,547,086 | B2* | 1/2017 | Dunik .................. G01C 21/165 |
| 9,709,405 | B2* | 7/2017 | Sotak ...................... G01P 15/18 |
| 9,726,499 | B2* | 8/2017 | Coatantiec ........... G01C 21/165 |
| 9,915,734 | B2* | 3/2018 | Scheitlin ............... G01S 19/074 |
| 9,939,532 | B2* | 4/2018 | Kana ........................ G01S 19/47 |
| 10,018,729 | B2* | 7/2018 | Dunik .................. G01C 21/165 |
| 10,466,362 | B1* | 11/2019 | Wang ...................... G01S 19/20 |
| 10,889,302 | B2* | 1/2021 | Kana ....................... G01S 19/47 |
| 2009/0182493 | A1* | 7/2009 | McDonald ............. G01S 19/52 |
| | | | 701/532 |
| 2009/0182494 | A1* | 7/2009 | McDonald ............. G01S 19/20 |
| | | | 701/532 |
| 2009/0182495 | A1 | 7/2009 | McDonald et al. |
| 2011/0084874 | A1 | 4/2011 | Coatantiec |
| 2017/0336517 | A1 | 11/2017 | Petillon |

\* cited by examiner

INTEGRITY MONITORING OF PRIMARY AND DERIVED PARAMETERS

The project leading to this application has received funding from the Clean Sky 2 Joint Undertaking under the European Union's Horizon 2020 research and innovation programme under grant agreement No 807097.

BACKGROUND

A global navigation satellite system (GNSS) is a system of space-based satellites that provide autonomous geo-spatial positioning with global coverage. Generally, a GNSS allows receivers to determine their location using time signals transmitted along a line-of-sight from the satellites. The Global Positioning System (GPS) is a GNSS that is maintained by the United States government and can be used by anyone with a GPS receiver. Similarly, GLONASS is a navigation satellite system maintained by Russia. The Galileo system is another GNSS developed by the European Union (EU) and European Space Agency (ESA). COMPASS (BeiDou) is a navigation satellite system developed by China.

A GNSS provides location information anywhere on or near the Earth where there is an unobstructed line of sight to four or more GNSS satellites. A processor coupled to the GNSS receiver uses at least four of the distances from the receiver to the satellites, known as pseudoranges, to accurately approximate the position of the receiver. The accuracy of the approximate position, or position solution, varies as changing atmospheric conditions affect signal-to-noise ratios and signal transit times. The accuracy also varies as the orbiting satellites occasionally experience protracted failures during which they continue to operate while providing erroneous or extra-noisy signals. These and other factors appear as random noise in the transmitted signals, random errors in the computed pseudoranges, and ultimately as a random error in the position solution itself.

Aircraft navigation systems based on the GNSS typically include a subsystem for integrity monitoring. Integrity is a measure of the trust that can be placed in the correctness of the information supplied by the navigation system. Integrity includes the ability of a system to provide timely (within limits specified by the time-to-alert) and valid warnings to the user when the system must not be used for the intended operation (or phase of flight). As part of these warnings, the system may calculate one or more protection limits. For the integrity to be considered available for a particular phase of flight, the protection level shall be less than the alert limit specified for that phase of flight. If the protection level exceeds the allowed alert limit, this means the navigation system is not able to provide the required integrity and must not be used further.

SUMMARY

Systems and methods for integrity monitoring of primary and derived parameters are described herein. In certain embodiments, a method includes transforming an estimated error state covariance matrix of at least one primary integrity monitoring parameter of a navigation system onto an error state covariance matrix of one or more derived integrity monitoring parameters, wherein the one or more derived integrity monitoring parameters depends from the at least one primary integrity monitoring parameter. The method also includes transforming an integrity threshold of the at least one primary integrity monitoring parameter onto separation parameters of the one or more derived integrity monitoring parameters. The method further includes computing a protection limit for the one or more derived integrity monitoring parameters.

DRAWINGS

Understanding that the drawings depict only some embodiments and are not therefore to be considered limiting in scope, the exemplary embodiments will be described with additional specificity and detail using the accompanying drawings, in which.

Figure 1:
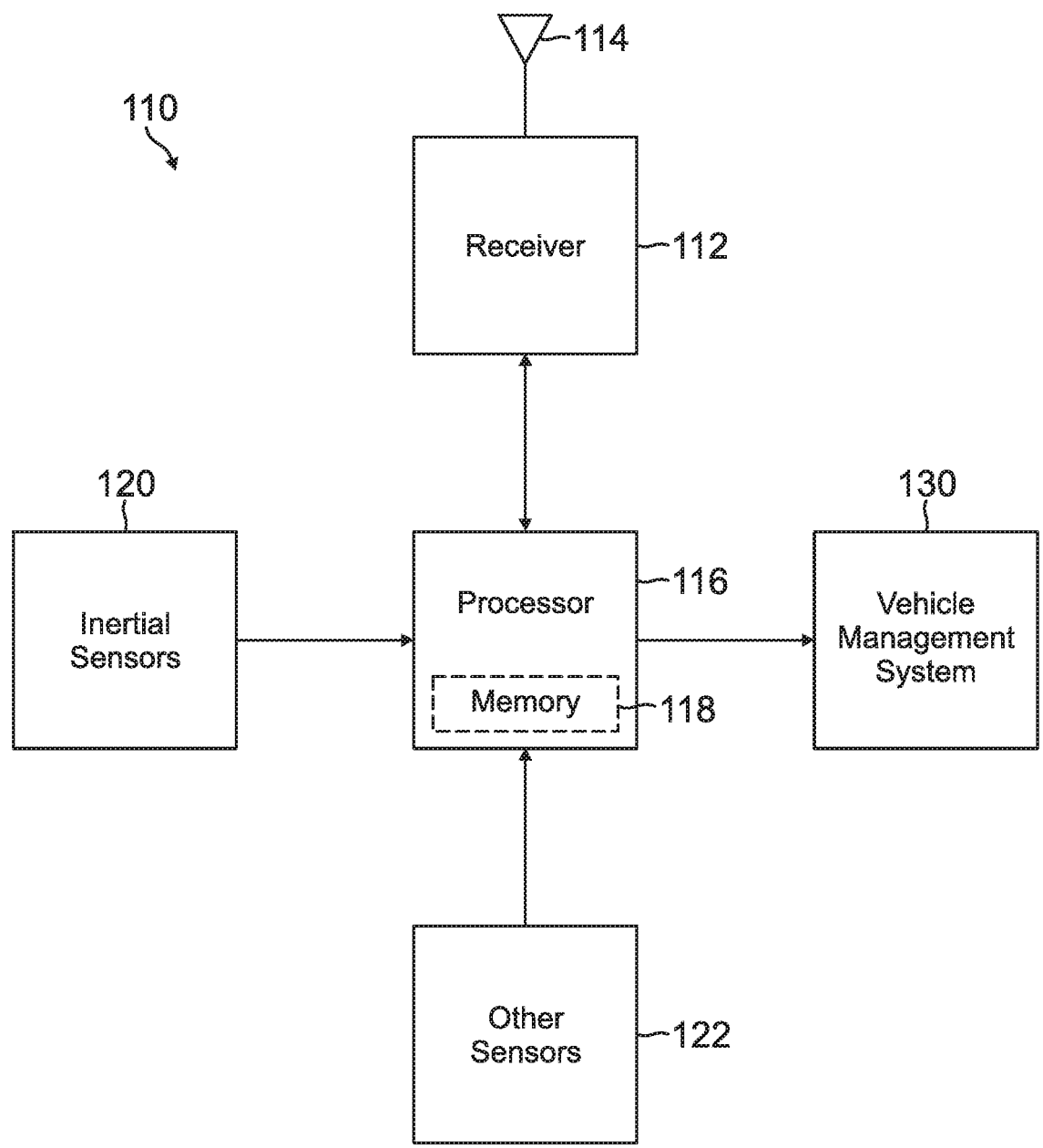
FIG. 1 is a block diagram illustrating an exemplary system for integrity monitoring of primary and derived parameters according to an aspect of the present disclosure.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made.

As stated above and used herein, integrity is a measure of the level of trust that can be placed in the correctness of the information supplied by a navigation system. A system that performs integrity monitoring may monitor the integrity of the various measurements during the operation of the navigation system. To perform integrity monitoring, systems may implement integrity monitoring algorithms.

In certain embodiments, integrity monitoring algorithms are based on a solution separation methodology. In a solution separation methodology, a system determines a full solution and one or more subsolutions, where the full solution is calculated based on information acquired from a set of information sources and the subsolutions are calculated based on information acquired from subsets of the set of information sources. Using the full solution and the subsolutions, a system may determine the integrity of the full solution.

The solution separation methodology, described above, may be used to determine the integrity of a position solution calculated from information acquired from navigation satellites. For example, the main position solution may incorporate a set of pseudoranges from available satellites that are integrated with inertial sensors measurements, where the subsolutions are based on a subset of the pseudoranges from the available satellites. The system may then determine the protection limits for the main position solution based on differences or separations between the main position solution and the subsolutions.

In certain embodiments, a system may perform integrity monitoring using the solution separation methodology on a defined set of primary parameters. A primary parameter may be a parameter in which a system directly performs fault detection and exclusion for the parameter. When the system calculates navigation parameters, the system may calculate protection limits for the primary navigation parameters. Examples of primary navigation parameters may include horizontal position, vertical position, horizontal velocity, vertical velocity, roll angle, pitch angle, and true heading angle.

In some embodiments, it may be desirable to determine parameters other than the primary parameters. For example, a system that calculates navigation parameters may attempt to determine additional navigation parameters that may include body longitudinal velocity, body lateral velocity, body normal velocity, magnetic track angle, drift angle, (hybrid) flight path angle, along heading velocity, true track angle, and cross heading velocity. However, calculating the additional parameters may increase the amount of fault detection and exclusions performed by a particular system. Accordingly, systems and method described herein derive integrity monitoring parameters for the additional parameters from the primary integrity monitoring parameters for which the system is already performing fault detections and exclusions.

FIG. 1 illustrates a navigation system 110 according to one embodiment, which can implement methods for deriving integrity monitoring parameters from primary integrity monitoring parameters described herein. The navigation system 110 may be mounted to a vehicle, such as an aircraft, spacecraft, automobile, or other mobile vehicle. Additionally, the navigation system 110 may acquire navigation information from one or more different sources. To process the acquired navigation information, the navigation system 110 may include at least one processor 116 and at least one memory unit 118.

In certain embodiments, the navigation system 110 may acquire navigation information that includes inertial motion information and GNSS measurements. To acquire the inertial motion information, the navigation system 110 may include inertial sensors 120 that measure and sense the inertial motion of the vehicle containing the navigation system 110. To acquire the GNSS measurements, the navigation system 110 may include a satellite receiver 112 with at least one antenna 114 that receives satellite signals from GNSS satellites. Additionally, the navigation system 110 may include one or more other sensors 122, which may provide additional sensor data to the processor 116. Examples of other sensors 122 may include an altitude sensor, an electro-optical sensor, or a magnetometer, among others.

During operation, the satellite receiver 112 may receive satellite signals such as GNSS signals, extract the position and time data from the signals, and provide pseudorange measurements to the processor 116. From the pseudorange measurements and the inertial measurements, processor 116 derives a position, velocity, and attitude solution. The processor 116 may also use the pseudorange measurements to detect satellite transmitter faults and to determine a worst-case error, or protection limit. The processor 116 may then provide the protection limit, along with the position solution to a vehicle management system 130. The vehicle management system 130 may compare the protection limit to an alarm limit for the particular vehicle containing the navigation system 110.

The processor 116 or other computational devices used in the present system and methods may be implemented using software, firmware, hardware, or any appropriate combination thereof. The processor 116 and other computational devices may be supplemented by, or incorporated in, specially-designed application-specific integrated circuits (ASICs) or field programmable gate arrays (FGPAs). In some implementations, the processor 116 and/or other computational devices may communicate through an additional transceiver with other computing devices outside of the navigation system 110. The processor 116 and other computational devices can also include or function with software programs, firmware, or other computer readable instructions for carrying out various process tasks, calculations, and control functions used in the present methods and systems.

The present methods may be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

In certain embodiments, the processor 116 may receive GNSS signals and monitor integrity monitoring parameters using a solution separation method. As described above, in a solution separation method, a set of test statistics may be formed by the difference between a computed full-solution position and each computed sub-solution position. The processor 116 may calculate a set of decision thresholds based on the statistics of the separation between the full-solution and sub-solution positions. The full-solution provides position estimates computed using all available satellite measurements (pseudoranges). In comparison, the set of sub-solutions provide the estimate using subsets of available satellite measurements defined according to specified fault states. For example, under the assumption that only one satellite can be in fault at any given time and N satellite measurements are available, there will be N statistics to be tested and N sub-solutions where each sub-solution position is computed by removing one different measurement. The solution separation method is thus an integrity method working in the position domain and can be used by the processor 116 in the navigation system 110 to determine the integrity of the measured parameters calculated from the pseudoranges.

Using the solution separation methodology, the processor 116 may perform integrity monitoring for primary integrity monitoring parameters. As used herein, a primary integrity monitoring parameter (also referred to as a primary parameter) may be a parameter for which the processor 116 directly performs fault detection and exclusion independently of other primary integrity monitoring parameters. For example, the processor 116 may perform integrity monitoring on the following primary integrity monitoring parameters: horizontal position, vertical position, horizontal velocity, vertical velocity, roll angle, pitch angle, and true heading angle.

In certain embodiments, the processor 116 may monitor the integrity of parameters other than the primary integrity monitoring parameters described above. For example, the processor 116 may monitor parameters that may include body longitudinal velocity, body lateral velocity, body normal velocity, magnetic track angle, drift angle, (hybrid) flight path angle, along heading velocity, true track angle, and cross heading velocity. Further, the processor 116 may monitor these additional parameters based on the monitoring of the primary integrity monitoring parameters. Accordingly, as used herein, an integrity monitoring parameter that is wholly algebraically derived from primary integrity monitoring parameters may be referred to as a derived integrity monitoring parameter. Since the fault detection and exclusion is performed on the primary integrity monitoring parameters and the derived integrity monitoring parameters are derived from the primary integrity monitoring parameters, performing fault detection and exclusion for the derived integrity monitoring parameters is not necessary. In some embodiments, the protection limits of derived integrity monitoring parameters may be computed. In some embodiments, a set of primary integrity monitoring parameters may be extended to assure a complete algebraical dependency of the derived integrity monitoring parameters on the primary integrity monitoring parameters.

In some embodiments, the processor 116 may determine a derived integrity monitoring parameter protection limit by transforming an estimated error state covariance matrix for one or more primary integrity monitoring parameters into an error state covariance matrix for the desired derived integrity monitoring parameters. For example, when converting primary integrity monitoring parameters into derived integrity monitoring parameters, the processor 116 may calculate a Jacobian, where the Jacobian is a matrix of first order partial derivatives of the function that transforms the primary integrity monitoring parameters into a derived integrity monitoring parameter. Using the calculated Jacobians, the processor 116 may then convert a covariance matrix of the primary integrity monitoring parameter into a covariance matrix for the derived integrity monitoring parameters. Additionally, the processor 116 may convert integrity thresholds for the primary integrity monitoring parameters into separation parameters for the derived integrity monitoring parameters. Further, the processor 116 may also compute protection limits for the derived integrity monitoring parameters. The calculation of the derived integrity monitoring parameters protection limits are described in greater detail below in connection with FIGS. 2 and 3.

Figure 2:
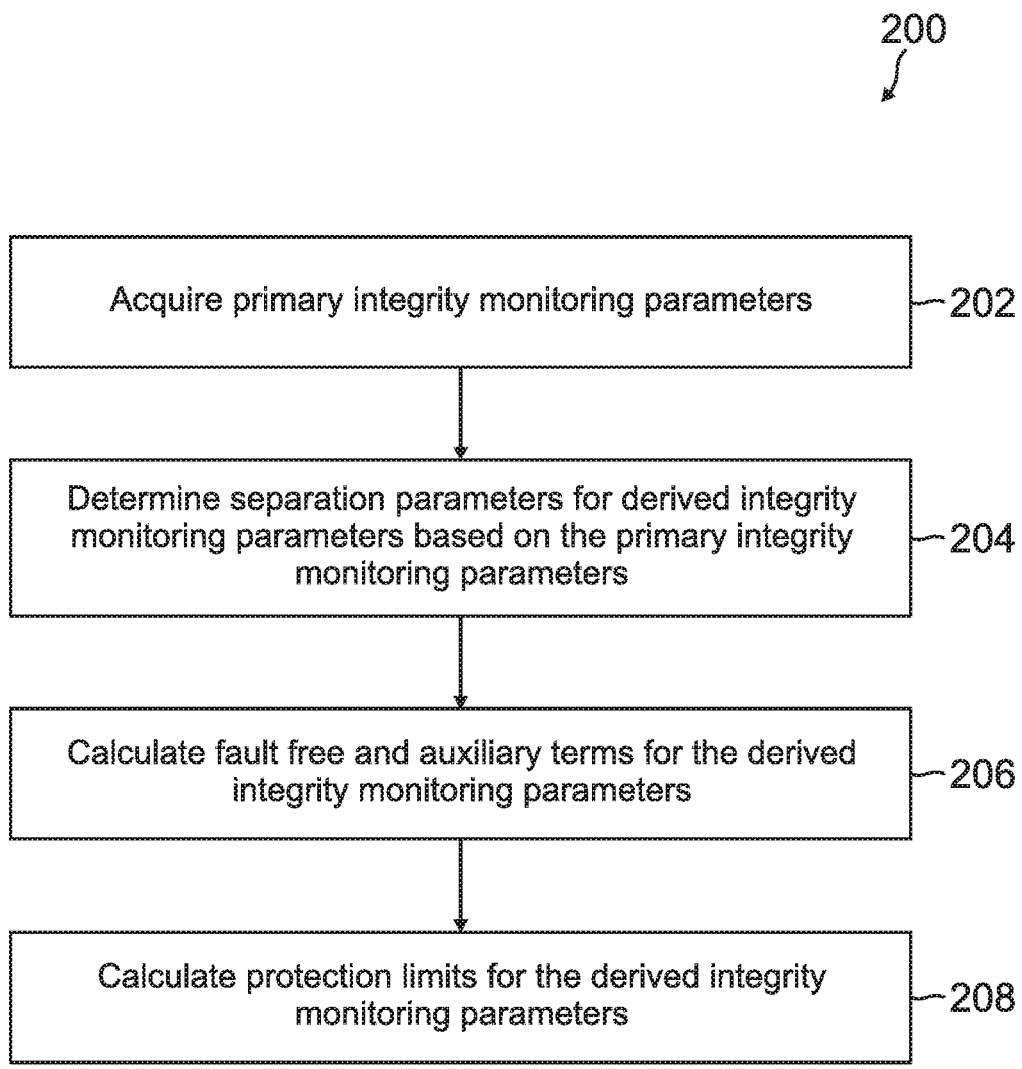
FIG. 2 is a flowchart diagram illustrating an exemplary method for integrity monitoring of primary and derived parameters according to an aspect of the present disclosure.

FIG. 2 is a flow diagram of an exemplary method 200 for calculating protection limits of derived integrity monitoring parameters. As described herein, the method 200 may be performed by the processor 116. However, the method 200 may be performed by a different processor on the navigation system 110, or other processor that is part of a system in communication with the navigation system 110. In certain embodiments, method 200 proceeds at 202, where primary integrity monitoring parameters are acquired. As described above, the integrity monitoring parameters are calculated based on measurements. For example, primary integrity monitoring parameters may include a horizontal position, a vertical position, a horizontal velocity, a vertical velocity, a roll angle, a pitch angle; and a true heading angle.

In calculating the primary integrity monitoring parameters, the processor 116 on the navigation system 110 may obtain pseudorange measurements from the receiver 112. The processor 116 may determine the number of satellite transmitters in communication with the navigation system 110, where the number of satellites varies as satellites move in and out of view of the receiver 112 and as satellites fail or otherwise become unavailable. Also, the processor 116 may mask certain satellites. In some embodiments, after determining the number of satellite transmitters, the processor 116 may use Kalman filtering to integrate the pseudorange measurements to acquire the position solution for the navigation system 110.

In further embodiments, the processor 116 may determine a full-solution position using the pseudorange Kalman filter innovations derived from the different signals from the associated satellites. The processor 116 may use any known technique for determining the full-solution position for the navigation system 110. When the processor 116 determines the full-solution position, the processor 116 may then calculate the subsolutions based on one or more respective subsets of the pseudorange measurements. For example, when there are N satellites that each provide a respective pseudorange measurements, a subset may be based on N−1 pseudorange measurements. Where each different subsolution excludes a pseudorange measurement received from a different satellite.

In additional embodiments, the processor 116 may compute discriminators for the respective subsolutions. The discriminator may be any mathematical quantity based on a mathematical distance or separation between the subsolutions and the full solutions. Additionally, the processor 116 may compute a set of solution separation parameters based on the discriminators. Further, the processor 116 may then compare actual separations to the solution separation parameters, where the solution separation parameters function as fault detection thresholds for the separate subsolutions. For example, if the actual separation between a subsolution and the full solution exceed a respective separation parameter or threshold, the processor 116 may set a failure flag that indicates the detection of a satellite transmitter fault.

In further embodiments, the processor 116 may determine error parameters or auxiliary terms based on the noise induced errors in respective subsolutions, where a noise-induced error forces subsolutions away from the actual position of the navigation system 110. Also, the processor 116 may determine a protection limit, or error bound, using the solution separation parameters and the subsolution auxiliary terms. For example, the processor 116 may determine a protection limit based on the maximum sum of a subsolution threshold or separation parameter and an auxiliary term for the different subsolutions.

In certain embodiments, the processor 116 may calculate an auxiliary term for a subsolution n of a primary parameter. In some implementations, the covariance for a sub solution may be expressed in terms of the velocity vector, roll, pitch, and heading uncertainty, according to the following:

$$\mathrm{Cov}\left(\begin{bmatrix}\delta v^N \\ \begin{bmatrix}\delta\phi \\ \delta\theta \\ \delta\psi\end{bmatrix}\end{bmatrix}\right)_n.$$

In some implementations, the error state covariance matrix for the full solution may be expressed in terms of velocity vector, roll, pitch, and heading uncertainty, according to the following:

$$\mathrm{Cov}\left(\begin{bmatrix}\delta v^N \\ \begin{bmatrix}\delta\phi \\ \delta\theta \\ \delta\psi\end{bmatrix}\end{bmatrix}\right)_{0,ff}$$

In certain embodiments, when the primary integrity monitoring parameters are acquired, the method 200 may proceed at 204, where separation parameters are determined for derived integrity monitoring parameters based on the primary integrity monitoring parameter thresholds. For example, the processor 116 may transform a threshold for one or more of the primary integrity monitoring parameters onto a separation parameter of one or more derived integrity monitoring parameters.

The processor 116 may calculate the separation parameter for each derived integrity monitoring parameter from the calculated thresholds $D_n^P$ for the primary integrity monitoring parameters as follows:

$$D_n^{D,i} = |J_P^{D,i} D_n^P|.$$

Accordingly, the separation parameter for a particular derived integrity monitoring parameter may be set equal to the vector magnitude of a Jacobian $J_P^{D,i}$ for the derived integrity monitoring parameter multiplied by the vector of thresholds $D_n^P$ for the primary integrity monitoring parameters.

As described above, the derived integrity monitoring parameters may include the body longitudinal velocity, and the body lateral velocity. As described herein, the different derived integrity monitoring parameters may be derived from the primary integrity monitoring parameters. For example, the separation parameter for the body longitudinal velocity may be set equal to the vector magnitude of the Jacobian for the body longitudinal velocity multiplied by the threshold vector for the primary integrity monitoring, as follows:

$$D_n^{v^{Bx}} = |J_P^{v^{Bx}} D_n^P|.$$

Further, the separation parameter for the body lateral velocity may be equal to the vector magnitude of the Jacobian for the body lateral velocity multiplied by the threshold vector for the primary integrity monitoring, as follows:

$$D_n^{v^{By}} = |J_P^{v^{By}} D_n^P|.$$

Additionally, the separation parameter for the body normal velocity may be equal to the vector magnitude of the Jacobian for the body normal velocity multiplied by the threshold vector for the primary integrity monitoring, as follows:

$$D_n^{v^{Bz}} = |J_P^{v^{Bz}} D_n^P|.$$

In additional embodiments, the derived integrity monitoring parameters may include the drift angle, the flight path angle, the along heading velocity, the cross heading velocity, and the magnetic track angle. In a similar manner to the body velocities described above, the separation parameter for the drift angle may be set equal to the vector magnitude of the Jacobian for the drift angle multiplied by the threshold vector for the primary integrity monitoring, as follows:

$$D_n^{DA^t} = |J_P^{DA^t} D_n^P|.$$

Also, the separation parameter for the flight path angle may be equal to the vector magnitude of the Jacobian for the flight path angle multiplied by the threshold vector for the primary integrity monitoring, as follows:

$$D_n^{FPA^t} = |J_P^{FPA^t} D_n^P|.$$

Further, the separation parameter for the along heading velocity may be equal to the vector magnitude of the Jacobian for the along heading velocity multiplied by the threshold vector for the primary integrity monitoring, as follows:

$$D_n^{v^{Lx}} = |J_P^{v^{Lx}} D_n^P|.$$

Moreover, the separation parameter for the cross heading velocity may be equal to the vector magnitude of the Jacobian for the cross heading velocity multiplied by the threshold vector for the primary integrity monitoring, as follows:

$$D_n^{v^{Ly}} = |J_P^{v^{Ly}} D_n^P|.$$

In some embodiments, the method 200 may proceed at 206, where fault free and auxiliary terms may be calculated for the derived integrity monitoring parameters. To calculate the fault free and auxiliary terms, the processor 116 may transform an estimated state covariance for one or more primary integrity monitoring parameters for a navigation system 110 onto a covariance of one or more derived integrity monitoring parameters. In certain implementations, the processor 116 may transform the estimated state covariance for one or more error estimates for the primary integrity monitoring parameters for both the full solution and the different subsolutions. For example, when determining the covariance for the derived integrity monitoring parameters for the full solution, the processor 116 may calculate the covariance for the full solution for the derived integrity monitoring parameters as follows:

$$\mathrm{Cov}((\delta x_0^{D,i}) = J_P^{D,i} \mathrm{Cov}(\delta x_0^P)(J_P^{D,i})^T.$$

Also, the processor 116 may calculate the covariance of the subsolutions for the derived integrity monitoring parameters as follows:

$$\mathrm{Cov}(\delta x_n^{D,i}) = J_P^{D,i} \mathrm{Cov}(\delta x_0^P)(J_P^{D,i})^T.$$

As shown, the processor 116 may calculate the covariance for the full solution and subsolutions of the derived integrity monitoring parameter by multiplying the Jacobian for the derived integrity monitoring parameter respectively by the covariance of the full solution estimation errors and the subsolution estimation errors and then the result by the transpose of the Jacobian for the derived integrity monitoring parameter.

In additional embodiments, the processor 116 may use the calculated covariance matrix for the derived integrity monitoring parameters to calculate an auxiliary term for a particular derived integrity monitoring parameter. For example, the processor 116 may calculate an auxiliary term for a derived integrity monitoring parameter as follows:

$$a_n^{D,i} = K_{md}\sqrt{\mathrm{Cov}(\delta x_n^{D,i})}.$$

As shown, the processor 116 calculates the auxiliary term for a particular subsolution by multiplying the missed detection sigma multiplier by the square root of the covariance of a subsolution estimation error for a particular derived integrity monitoring parameter.

Similar to the calculation of the separation parameters, the auxiliary terms of the derived integrity monitoring parameters may be calculated for the body longitudinal velocity, the body lateral velocity, and the body normal velocity. For example, the auxiliary term for the body longitudinal velocity may be set equal to the missed detection sigma multiplier multiplied by the square root of the covariance of a subsolution error estimate for the body longitudinal velocity, as follows:

$$a_n^{v^{Bx}} = K_{md} \sqrt{\text{Cov}(\delta v^{Bx})_n}.$$

Further, the auxiliary term for the body lateral velocity may be equal to the missed detection sigma multiplier multiplied by the square root of the covariance of a subsolution error estimate for the body lateral velocity, as follows:

$$a_n^{v^{By}} = K_{md} \sqrt{\text{Cov}(\delta v^{By})_n}.$$

Additionally, the auxiliary term for the body normal velocity may be equal to the missed detection sigma multiplier multiplied by the square root of the covariance of a subsolution error estimate for the body normal velocity, as follows:

$$a_n^{v^{Bz}} = K_{md} \sqrt{\text{Cov}(\delta v^{Bz})_n}.$$

In additional embodiments, the derived integrity monitoring parameters may include the drift angle, the flight path angle, the along heading velocity, the cross heading velocity, and the magnetic track angle. In a similar manner to the body velocities described above, the auxiliary term for the drift angle may be equal to the missed detection sigma multiplier multiplied by the square root of the covariance of a subsolution error estimate for the drift angle, as follows:

$$a_n^{DA^t} = K_{md} \sqrt{\text{Cov}(\delta DA^t)_n}.$$

Also, the auxiliary term for the flight path angle may be equal to the missed detection sigma multiplier multiplied by the square root of the covariance of a subsolution error estimate for the flight path angle, as follows:

$$a_n^{FPA^t} = K_{md} \sqrt{\text{Cov}(\delta FPA^t)_n}.$$

Further, the auxiliary term for the along heading velocity may be equal to the missed detection sigma multiplier multiplied by the square root of the covariance of a subsolution error estimate for the along heading velocity, as follows:

$$a_n^{v^{Lx}} = K_{md} \sqrt{\text{Cov}(\delta v^{Lx})_n}.$$

Moreover, the auxiliary term for the cross heading velocity may be equal to the missed detection sigma multiplier multiplied by the square root of the covariance of a subsolution error estimate for the cross heading velocity, as follows:

$$a_n^{v^{Ly}} = K_{md} \sqrt{\text{Cov}(\delta v^{Ly})_n}.$$

In some embodiments, the method 200 may proceed at 208, where protection limits may be calculated for the derived integrity monitoring parameters. To calculate the protection limits, the processor 116 may first calculate a fault free protection limit for a particular derived integrity monitoring parameter. For example, when determining the fault free protection limit for a particular derived integrity monitoring parameter, the processor 116 may multiply the fault free sigma multiplier by the square root of the covariance of the full solution error estimate or full solution error state covariance for a particular derived integrity monitoring parameter as follows:

$$xPL_{H0} = K_{ff} \sqrt{\text{Cov}(\delta x_0^{D,i})}.$$

When the fault free protection limit is calculated, the processor 116 may calculate the protection for the derived integrity monitoring parameter as follows:

$$xPL = \max\left(xPL_{H0}, \max_n (D_n^{D,i} + a_n^{D,i})\right).$$

As shown, the processor 116 may calculate the protection limit as the maximum of the fault free protection limit and the maximum separation parameter and auxiliary term combination for the various sub solutions.

Similar to the calculation of the separation parameters, the processor 116 may calculate the fault free protection limit and protection limit for the derived integrity monitoring parameters body longitudinal velocity, body lateral velocity, and body normal velocity. For example, the fault free protection limit for the body longitudinal velocity may be equal to the fault free sigma multiplier multiplied by the square root of the covariance of a full solution error estimate for the body longitudinal velocity, as follows:

$$LoVPL_{H0} = K_{ff} \sqrt{\text{Cov}(\delta v^{Bx})_{0,ff}}.$$

Also, the protection limit for the body longitudinal velocity may be equal to the maximum of the fault free protection limit and the maximum separation parameter and auxiliary term combination for the various subsolutions of the body longitudinal velocity as follows:

$$LoVPL = \max\left(LoVPL_{H0}, \max_n (D_n^{v^{Bx}} + a_n^{v^{Bx}})\right).$$

Further, the fault free protection limit for the body lateral velocity may be equal to the fault free sigma multiplier multiplied by the square root of the covariance of a full solution error estimate for the body lateral velocity, as follows:

$$LaVPL_{H0} = K_{ff} \sqrt{\text{Cov}(\delta v^{By})_{0,ff}}.$$

Also, the protection limit for the body lateral velocity may be equal to the maximum of the fault free protection limit and the maximum separation parameter and auxiliary term combination for the various subsolutions of the body lateral velocity as follows:

$$LaVPL = \max\left(LaVPL_{H0}, \max_n (D_n^{v^{By}} + a_n^{v^{By}})\right).$$

Additionally, the fault free protection limit for the body normal velocity may be equal to the fault free sigma multiplier multiplied by the square root of the covariance of a full solution error estimate for the body normal velocity, as follows:

$$NoVPL_{H0} = K_{ff} \sqrt{\text{Cov}(\delta v^{Bz})_{0,ff}}.$$

Also, the protection limit for the body normal velocity may be equal to the maximum of the fault free protection limit and the maximum separation parameter and auxiliary term combination for the various subsolutions of the body normal velocity as follows:

$$NoVPL = \max\left(NoVPL_{H0}, \max_n\left(D_n^{v^{Bz}} + a_n^{v^{Bz}}\right)\right).$$

In additional embodiments, the derived integrity monitoring parameters may include the drift angle, the flight path angle, the along heading velocity, the cross heading velocity, and the magnetic track angle. In a similar manner to the body velocities described above, the fault free protection limit for the drift angle may be equal to the fault free sigma multiplier multiplied by the square root of the covariance of a full solution error estimate for the drift angle, as follows:

$$DAPL_{H0} = K_{\!f\!f} \sqrt{\mathrm{Cov}(\delta DA^t)_{0,\!f\!f}}.$$

Also, the protection limit for the drift angle may be equal to the maximum of the fault free protection limit and the maximum separation parameter and auxiliary term combination for the various subsolutions of the drift angle as follows:

$$DAPL = \max\left(DAPL_{H0}, \max_n\left(D_n^{DA^t} + a_n^{DA^t}\right)\right).$$

Further, the fault free protection limit for the flight path angle may be equal to the fault free sigma multiplier multiplied by the square root of the covariance of a full solution error estimate for the flight path angle, as follows:

$$FPAPL_{H0} = K_{\!f\!f} \sqrt{\mathrm{Cov}(\delta FPA^t)_{0,\!f\!f}}.$$

Also, the protection limit for the flight path angle may be equal to the maximum of the fault free protection limit and the maximum separation parameter and auxiliary term combination for the various subsolutions of the flight path angle as follows:

$$FPAPL = \max\left(FPAPL_{H0}, \max_n\left(D_n^{FPA^t} + a_n^{FPA^t}\right)\right).$$

Further, the fault free protection limit for the along heading velocity may be equal to the fault free sigma multiplier multiplied by the square root of the covariance of a full solution error estimate for the along heading velocity, as follows:

$$AYVPL_{H0} = K_{\!f\!f} \sqrt{\mathrm{Cov}(\delta v^{Lx})_{0,\!f\!f}}.$$

Also, the protection limit for the along heading velocity may be equal to the maximum of the fault free protection limit and the maximum separation parameter and auxiliary term combination for the various subsolutions of the along heading velocity as follows:

$$AYVPL = \max\left(AYVPL_{H0}, \max_n\left(D_n^{v^{Lx}} + a_n^{v^{Lx}}\right)\right).$$

Moreover, the fault free protection limit for the cross heading velocity may be equal to the fault free sigma multiplier multiplied by the square root of the covariance of a full solution error estimate for the cross heading velocity, as follows:

$$CYVPL_{H0} = K_{\!f\!f} \sqrt{\mathrm{Cov}(\delta v^{Ly})_{0,\!f\!f}}.$$

Also, the protection limit for the cross heading velocity may be equal to the maximum of the fault free protection limit and the maximum separation parameter and auxiliary term combination for the various subsolutions of the cross heading velocity as follows:

$$CYVPL = \max\left(CYVPL_{H0}, \max_n\left(D_n^{v^{Ly}} + a_n^{v^{Ly}}\right)\right).$$

As described above, the processor 116 may derive the derived integrity monitoring parameters from the primary integrity monitoring parameters.

Figure 3:
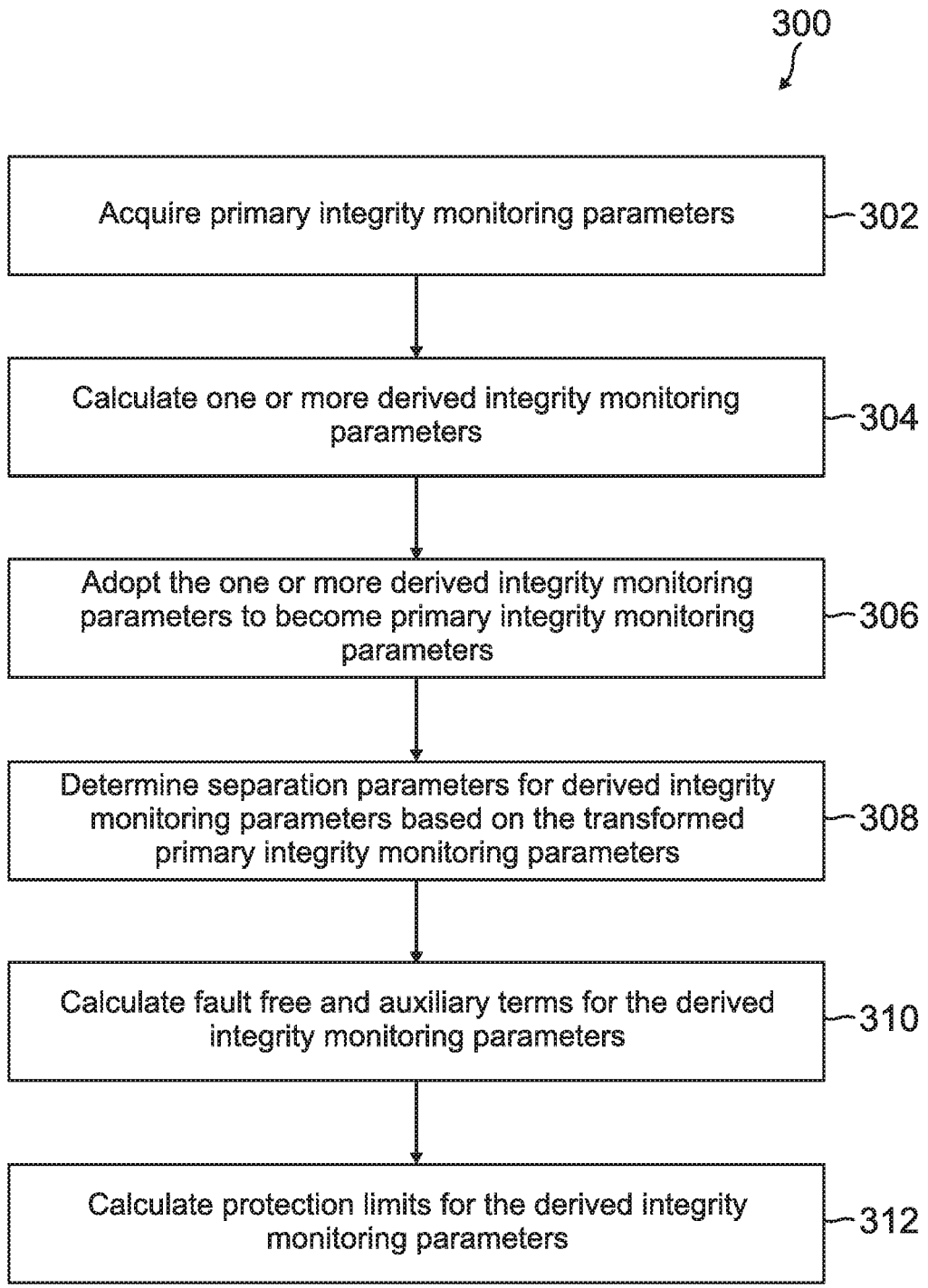
FIG. 3 is a flowchart diagram illustrating a further exemplary method for integrity monitoring of primary and derived parameters according to an aspect of the present disclosure.

FIG. 3 is a flow diagram of an exemplary method 300 for calculating derived integrity monitoring parameters. Like the method 200, the method 300 may be performed by the processor 116, a different processor on the navigation system 110, or other processor that is part of a system in communication with the navigation system 110. In certain embodiments, method 300 proceeds at 302, where primary integrity monitoring parameters are acquired. The method 300 acquires the primary integrity monitoring parameters in a manner similar to that described above with respect to FIG. 2.

In certain embodiments, the method 300 proceeds at 304, where one or more derived integrity monitoring parameters are calculated. Further, the method 300 proceeds at 306, where the one or more derived integrity monitoring parameters are adopted to become primary integrity monitoring parameters. For example, the processor 116 may calculate one or more derived integrity monitoring parameters and then adopt the derived integrity monitoring parameters as primary integrity monitoring parameters and then base the calculation of subsequent derived integrity monitoring parameters on the new set of primary integrity monitoring parameters.

In some embodiments, the processor 116 may calculate the true track angle based on previously calculated navigation parameters. In some implementations, the calculation of the true track angle and ground speed is based on horizontal components of velocity. For example, the processor 116 may calculate the true track angle and ground speed according to the following:

$$TA^t = a\tan 2(v^{Ny}, v^{Nx}) \text{ and}$$

$$GS = \sqrt{(v^{Nx})^2 (v^{Ny})^2}.$$

The processor 116 may then adopt the true track angle and ground speed as primary integrity monitoring parameters by transforming the horizontal velocity components into the true track angle and ground speed domain.

In further embodiments, the processor 116 may calculate the covariances in the true track angle and ground speed domain by transforming the covariances of the horizontal components of the velocity estimate error into the (full and sub) covariance(variance) of the true track angle and ground speed estimation errors. For example, the processor 116 may calculate the discriminator for the true track angle and ground speed as the absolute value of the subsolution true track angle/ground speed minus the full solution true track angle/ground speed:

$$\Delta TA_n^t = \|TA_n^t - TA_0^t\| \text{ and}$$

$$\Delta GS = \|GS_n^t - GS_0^t\|.$$

With respect to the covariance of the true track angle estimation error, the processor 116 may respectively calculate the following for the subsolutions and the full solution:

$$\text{Cov}(\delta TA^t)_n(\delta TA^t)_n = J_{v^{Nx},v^{Ny}}^{TA^t} \text{Cov}\left(\begin{bmatrix}\delta v^{Nx}\\\delta v^{Ny}\end{bmatrix}_n\right)\left(J_{v^{Nx},v^{Ny}}^{TA^t}\right)^T \text{ and}$$

$$\text{Cov}(\delta TA^t)_0(\delta TA^t)_0 = J_{v^{Nx},v^{Ny}}^{TA^t} \text{Cov}\left(\begin{bmatrix}\delta v^{Nx}\\\delta v^{Ny}\end{bmatrix}_0\right)\left(J_{v^{Nx},v^{Ny}}^{TA^t}\right)^T.$$

where $J_{v^W,v^W}^{TA^t}$ is a Jacobian transforming the horizontal velocity onto the true track angle. With respect to the covariance of the ground speed estimation error, the processor 116 may respectively calculate the following for the subsolutions and the full solution:

$$\text{Cov}(\delta GS)_n = J_{v^{Nx},v^{Ny}}^{GS} \text{Cov}\left(\begin{bmatrix}\delta v^{Nx}\\\delta v^{Ny}\end{bmatrix}_n\right)\left(J_{v^{Nx},v^{Ny}}^{GS}\right)^T \text{ and}$$

$$\text{Cov}(\delta GS)_0 = J_{v^{Nx},v^{Ny}}^{GS} \text{Cov}\left(\begin{bmatrix}\delta v^{Nx}\\\delta v^{Ny}\end{bmatrix}_0\right)\left(J_{v^{Nx},v^{Ny}}^{GS}\right)^T.$$

where $J_{v^{Nx},v^{Ny}}^{GS}$ is a Jacobian transforming the horizontal velocity onto the ground speed.

In additional embodiments, the processor 116 may calculate thresholds and auxiliary terms for the true track angle and ground speed. For example, the processor 116 may calculate the threshold for the true track angle and ground speed as follows:

$$D_n^{TA^t} = K_{fa}\sqrt{\text{Cov}(TA^t)_n - \text{Cov}(TA^t)_0} \text{ and}$$

$$D_n^{GS} = K_{fa}\sqrt{\text{Cov}(GS)_n - \text{Cov}(GS)_0}.$$

The processor 116 may raise an alert if the magnitude of the discriminator exceeds the magnitude of the threshold. Additionally, the processor 116 may calculate an auxiliary terms for the true track angle and ground speed as follows:

$$a_n^{TA^t} = K_{md}\sqrt{\text{Cov}(\delta TA^t)_n} \text{ and}$$

$$a_n^{GS} = K_{md}\sqrt{\text{Cov}(\delta GS)_n}$$

When the covariance, thresholds, and auxiliary terms are calculated for the true track angle and ground speed, the processor 116 may calculate the protection limits for the true track angle and ground speed. For example, to first calculate the fault free protection limit for the true track angle/ground speed, the processor 116 may multiply the fault free sigma multiplier multiplied by the square root of the covariance of a full solution error estimate for the true track angle/ground speed, as follows:

$$TTAPL_{H0} = K_{ff}\sqrt{\text{Cov}(\delta TA^t)_0} \text{ and}$$

$$GSPL_{H0} = K_{ff}\sqrt{\text{Cov}(\delta GS)_0}.$$

Also, the processor 116 may calculate the protection limit for the true track angle and ground speed by identifying the maximum of the fault free protection limit and the maximum threshold and auxiliary term combination for the various subsolutions of the true track angle/ground speed as follows:

$$TTAPL = \max\left(TTAPL_{H0}, \max_n\left(D_n^{TA^t} + a_n^{TA^t}\right)\right) \text{ and}$$

$$GSPL = \max\left(GSPL_{H0}, \max_n\left(D_n^{GS} + a_n^{GS}\right)\right)$$

In certain embodiments, the processor 116 may transform the covariance matrix for the navigation parameters into a primary integrity monitoring parameters domain that includes true track angle and ground speed. For example, the processor 116 may transform the covariance matrix for the various subsolutions of the navigation parameters into a domain that includes the true track angle and ground speed according to the following:

$$\text{Cov}\left(\begin{bmatrix}\begin{bmatrix}\delta TA^t\\\delta GS\\\delta v^{Nz}\end{bmatrix}\\\begin{bmatrix}\delta\phi\\\delta\theta\\\delta\psi\end{bmatrix}\end{bmatrix}_n\right) = \begin{bmatrix}J_{v^{Nx},v^{Ny}}^{TA^t} & 0_{1\times 4}\\J_{v^{Nx},v^{Ny}}^{GS} & 0_{1\times 4}\\0_{4\times 2} & I_{4\times 4}\end{bmatrix}\text{Cov}\left(\begin{bmatrix}\delta v^N\\\begin{bmatrix}\delta\phi\\\delta\theta\\\delta\psi\end{bmatrix}\end{bmatrix}_n\right)\begin{bmatrix}J_{v^{Nx},v^{Ny}}^{TA^t} & 0_{1\times 4}\\J_{v^{Nx},v^{Ny}}^{GS} & 0_{1\times 4}\\0_{4\times 2} & I_{4\times 4}\end{bmatrix}^T.$$

where $J_{v^{Nx},v^{Ny}}^{TA^t}$ is a Jacobian transforming the horizontal velocity onto the true track angle and $J_{v^{Nx},v^{Ny}}^{GS}$ is a Jacobian transforming the horizontal velocity onto the ground speed.

Further, the processor 116 may transform the covariance matrix for the full solution for the navigation parameters into the domain that includes the true track angle and ground speed according to the following:

$$\text{Cov}\left(\begin{bmatrix}\begin{bmatrix}\delta TA^t\\\delta GS\\\delta v^{Nz}\end{bmatrix}\\\begin{bmatrix}\delta\phi\\\delta\theta\\\delta\psi\end{bmatrix}\end{bmatrix}_{0,ff}\right) = \begin{bmatrix}J_{v^{Nx},v^{Ny}}^{TA^t} & 0_{1\times 4}\\J_{v^{Nx},v^{Ny}}^{GS} & 0_{1\times 4}\\0_{4\times 2} & I_{4\times 4}\end{bmatrix}$$

$$\text{Cov}\left(\begin{bmatrix}\delta v^N\\\begin{bmatrix}\delta\phi\\\delta\theta\\\delta\psi\end{bmatrix}\end{bmatrix}_{0,ff}\right)\begin{bmatrix}J_{v^{Nx},v^{Ny}}^{TA^t} & 0_{1\times 4}\\J_{v^{Nx},v^{Ny}}^{GS} & 0_{1\times 4}\\0_{4\times 2} & I_{4\times 4}\end{bmatrix}^T.$$

Transforming the navigation parameters into the primary integrity monitoring parameters domain that includes true track angle and ground speed may facilitate the subsequent calculation of derived integrity monitoring parameters.

In some embodiments, method 300 may proceed at 308, where separation parameters for derived integrity monitoring parameters may be determined based on the transformed primary integrity monitoring parameters thresholds. In particular, the processor 116 may calculate covariance matrices for the derived integrity monitoring parameters based on the transformed covariance matrices for the primary integrity monitoring parameters. For example, the covariance matrices for the subsolutions for the derived integrity monitoring parameters that include the body velocities, the drift angle, the flight path heading, the along heading velocity, and the cross heading velocity may be calculated by multiplying the Jacobian matrices for the derived integrity monitoring parameters by the covariance matrix of the primary integrity monitoring parameter error estimates and then multiplying the result by the transpose of the Jacobian of the derived integrity monitoring parameters as follows:

$$\text{Cov}\left(\begin{bmatrix} \delta v^{Bx} \\ \delta v^{By} \\ \delta v^{Bz} \\ \delta(DA)^t \\ \delta FPA^t \\ \delta v^{Lx} \\ \delta v^{Ly} \end{bmatrix}\right)_n = \begin{bmatrix} J_{PIMC}^{vBx} \\ J_{PIMC}^{vBy} \\ J_{PIMC}^{vBz} \\ J_{PIMC}^{DA^t} \\ J_{PIMC}^{FPA^t} \\ J_{PIMC}^{vLx} \\ J_{PIMC}^{vLy} \end{bmatrix} \cdot \text{Cov}\left(\begin{bmatrix} \delta TA^t \\ \delta GS \\ \delta v^{Nz} \\ \delta \phi \\ \delta \theta \\ \delta \psi \end{bmatrix}\right)_n \cdot \begin{bmatrix} J_{PIMC}^{vBx} \\ J_{PIMC}^{vBy} \\ J_{PIMC}^{vBz} \\ J_{PIMC}^{DA^t} \\ J_{PIMC}^{FPA^t} \\ J_{PIMC}^{vLx} \\ J_{PIMC}^{vLy} \end{bmatrix}^T.$$

In a similar manner, the processor 116 may calculate the covariance matrix for the full solution for the derived integrity monitoring parameters as follows:

$$\text{Cov}\left(\begin{bmatrix} \delta v^{Bx} \\ \delta v^{By} \\ \delta v^{Bz} \\ \delta(DA)^t \\ \delta FPA^t \\ \delta v^{Lx} \\ \delta v^{Ly} \end{bmatrix}\right)_{0,ff} = \begin{bmatrix} J_{PIMC}^{vBx} \\ J_{PIMC}^{vBy} \\ J_{PIMC}^{vBz} \\ J_{PIMC}^{DA^t} \\ J_{PIMC}^{FPA^t} \\ J_{PIMC}^{vLx} \\ J_{PIMC}^{vLy} \end{bmatrix} \cdot \text{Cov}\left(\begin{bmatrix} \delta TA^t \\ \delta GS \\ \delta v^{Nz} \\ \delta \phi \\ \delta \theta \\ \delta \psi \end{bmatrix}\right)_{0,ff} \cdot \begin{bmatrix} J_{PIMC}^{vBx} \\ J_{PIMC}^{vBy} \\ J_{PIMC}^{vBz} \\ J_{PIMC}^{DA^t} \\ J_{PIMC}^{FPA^t} \\ J_{PIMC}^{vLx} \\ J_{PIMC}^{vLy} \end{bmatrix}^T.$$

Further, the method 300 may proceed at 310, where fault free and auxiliary terms for the derived integrity monitoring parameters may be calculated. In some implementations, the processor 116 may calculate the fault free and auxiliary terms for the derived integrity monitoring parameters as described above in FIG. 2.

In some embodiments, the processor 116 may calculate the true track angle based on previously calculated navigation parameters. In some implementations, the calculation of the true track angle is based on horizontal components of velocity that are independent from the ground speed. For example, the processor 116 may calculate the true track angle according to the following:

$$TA^t = a\tan 2(v^{Ny}, v^{Nx}).$$

The processor 116 may then adopt the true track angle as a primary integrity monitoring parameter by transforming the horizontal velocity components into the true track angle domain.

In further embodiments, the processor 116 may calculate the covariances in the true track angle domain by transforming the covariances of the horizontal components of the velocity estimate error into the (full and sub) covariance (variance) of the true track angle estimation error. For example, the processor 116 may calculate the discriminator for the true track angle as an absolute value of the subsolution true track angle minus the full solution true track angle:

$$\Delta TA_n^t = \|TA_n^t - TA_0^t\|.$$

With respect to the covariance of the true track angle estimation error, the processor 116 may respectively calculate the following for the subsolutions and the full solution:

$$\text{Cov}(\delta TA^t)_n = J_{v^{Nx},v^{Ny}}^{TA^t} \text{Cov}\left(\begin{bmatrix} \delta v^{Nx} \\ \delta v^{Ny} \end{bmatrix}\right)_n \left(J_{v^{Nx},v^{Ny}}^{TA^t}\right)^T, \text{ and}$$

$$\text{Cov}(\delta GS)_0 = J_{v^{Nx},v^{Ny}}^{GS} \text{Cov}\left(\begin{bmatrix} \delta v^{Nx} \\ \delta v^{Ny} \end{bmatrix}\right)_0 \left(J_{v^{Nx},v^{Ny}}^{GS}\right)^T.$$

where $J_{v^{Nx},v^{Ny}}^{TA^t}$ is a Jacobian transforming the horizontal velocity onto the true track angle.

In additional embodiments, the processor 116 may calculate thresholds and auxiliary terms for the true track angle. For example, the processor 116 may calculate the threshold for the true track angle as follows:

$$D_n^{TA^t} = K_{fa} \sqrt{\text{Cov}(TA^t)_n - \text{Cov}(TA^t)_0}.$$

The processor 116 may raise an alert if the magnitude of the discriminator exceeds the magnitude of the threshold. Additionally, the processor 116 may calculate an auxiliary term for the true track angle as follows:

$$a_n^{TA^t} = K_{md}\sqrt{\text{Cov}(\delta TA^t)_n}.$$

When the covariance, thresholds, and auxiliary terms are calculated for the true track angle, the processor 116 may calculate the protection limits for the true track angle. For example, to first calculate the fault free protection limit for the true track angle, the processor 116 may multiply the fault free sigma multiplier multiplied by the square root of the covariance of a full solution error estimate for the true track angle, as follows:

$$TTAPL_{H0} = K_{ff}\sqrt{\text{Cov}(\delta TA^t)_0}.$$

Also, the processor 116 may calculate the protection limit for the true track angle by identifying the maximum of the fault free protection limit and the maximum threshold and auxiliary term combination for the various subsolutions of the true track angle as follows:

$$TTAPL = \max\left(TTAPL_{H0}, \max_n\left(D_n^{TA^t} + a_n^{TA^t}\right)\right).$$

In certain embodiments, the processor 116 may transform the covariance matrix for the navigation parameters into a primary integrity monitoring parameters domain that includes the true track angle. For example, the processor 116 may transform the covariance matrix for the various subsolutions of the primary integrity monitoring parameters into a domain that includes the true track angle according to the following:

$$\text{Cov}\left(\begin{bmatrix} \delta TA^t \\ \delta v_{eig}^{Nh} \\ \delta v^{Nz} \\ \delta \phi \\ \delta \theta \\ \delta \psi \end{bmatrix}\right)_n = \begin{bmatrix} J_{v^{Nx},v^{Ny}}^{TA^t} & 0_{1\times 4} \\ v_{eig,max,n}^{v,h} & 0_{1\times 4} \\ 0_{4\times 2} & I_{4\times 4} \end{bmatrix} \text{Cov}\left(\begin{bmatrix} \delta v^N \\ \delta \phi \\ \delta \theta \\ \delta \psi \end{bmatrix}\right)_n \begin{bmatrix} J_{v^{Nx},v^{Ny}}^{TA^t} & 0_{1\times 4} \\ v_{eig,max,n}^{v,h} & 0_{1\times 4} \\ 0_{4\times 2} & I_{4\times 4} \end{bmatrix}^T.$$

where $J_{v^{Nx},v^{Ny}}^{TA^t}$ is a Jacobian transforming the horizontal velocity onto the true track angle and $v_{eig,max,n}^{v,h}$ is the maximum eigenvector of horizontal velocity covariance meaning the uncertainty of a ground speed in the worst case direction.

Further, the processor 116 may transform the covariance matrix for the full solution for the primary integrity monitoring parameters into the domain that includes the true track angle according to the following:

$$\text{Cov}\left(\begin{bmatrix} \begin{bmatrix} \delta TA^t \\ \delta v_{eig}^{Nh} \\ \delta v^{Nz} \end{bmatrix} \\ \begin{bmatrix} \delta\phi \\ \delta\theta \\ \delta\psi \end{bmatrix} \end{bmatrix}\right)_{0,ff} = \begin{bmatrix} J_{vNx,vNy}^{TA^t} & 0_{1\times 4} \\ K_{CEP,ff} v_{eig,max,n}^{v,h} & 0_{1\times 4} \\ 0_{4\times 2} & I_{4\times 4} \end{bmatrix}$$

$$\text{Cov}\left(\begin{bmatrix} \begin{bmatrix} \delta v^N \end{bmatrix} \\ \begin{bmatrix} \delta\phi \\ \delta\theta \\ \delta\psi \end{bmatrix} \end{bmatrix}\right)_{0,ff} \begin{bmatrix} J_{vNx,vNy}^{TA^t} & 0_{1\times 4} \\ K_{CEP,ff} v_{eig,max,n}^{v,h} & 0_{1\times 4} \\ 0_{4\times 2} & I_{4\times 4} \end{bmatrix}^T.$$

Transforming the navigation parameters into a primary integrity monitoring parameters domain that includes the true track angle may facilitate the subsequent calculation of derived integrity monitoring parameters.

In some embodiments, method 300 may proceed at 308, where separation parameters for derived integrity monitoring parameters may be determined based on the transformed primary integrity monitoring parameter thresholds. In particular, the processor 116 may calculate covariance matrices for the derived integrity monitoring parameters based on the transformed covariance matrices for the primary integrity monitoring parameters. For example, the covariance matrices for the subsolutions for the derived integrity monitoring parameters that includes the body velocities, the drift angle, the flight path heading, the along heading velocity, and the cross heading velocity may be calculated by multiplying the Jacobian matrices for the derived integrity monitoring parameters by the covariance matrix of the primary integrity monitoring parameter error estimates and then multiplying the result by the transpose of the Jacobian of the derived integrity monitoring parameters as follows:

$$\text{Cov}\left(\begin{bmatrix} \delta v^{Bx} \\ \delta v^{By} \\ \delta v^{Bz} \\ \delta(DA)^t \\ \delta FPA^t \\ \delta v^{Lx} \\ \delta v^{Ly} \end{bmatrix}\right)_n = \begin{bmatrix} J_{PIMC}^{vBx} \\ J_{PIMC}^{vBy} \\ J_{PIMC}^{vBz} \\ J_{PIMC}^{DA^t} \\ J_{PIMC}^{FPA^t} \\ J_{PIMC}^{vLx} \\ J_{PIMC}^{vLy} \end{bmatrix} \cdot \text{Cov}\left(\begin{bmatrix} \begin{bmatrix} \delta TA^t \\ \delta v_{eig}^{Nh} \\ \delta v^{Nz} \end{bmatrix} \\ \begin{bmatrix} \delta\phi \\ \delta\theta \\ \delta\psi \end{bmatrix} \end{bmatrix}\right)_n \cdot \begin{bmatrix} J_{PIMC}^{vBx} \\ J_{PIMC}^{vBy} \\ J_{PIMC}^{vBz} \\ J_{PIMC}^{DA^t} \\ J_{PIMC}^{FPA^t} \\ J_{PIMC}^{vLx} \\ J_{PIMC}^{vLy} \end{bmatrix}^T.$$

In a similar manner, the processor 116 may calculate the covariance matrix for the full solution for the derived integrity monitoring parameters as follows:

$$\text{Cov}\left(\begin{bmatrix} \delta v^{Bx} \\ \delta v^{By} \\ \delta v^{Bz} \\ \delta(DA)^t \\ \delta FPA^t \\ \delta v^{Lx} \\ \delta v^{Ly} \end{bmatrix}\right)_{0,ff} = \begin{bmatrix} J_{PIMC}^{vBx} \\ J_{PIMC}^{vBy} \\ J_{PIMC}^{vBz} \\ J_{PIMC}^{DA^t} \\ J_{PIMC}^{FPA^t} \\ J_{PIMC}^{vLx} \\ J_{PIMC}^{vLy} \end{bmatrix} \cdot \text{Cov}\left(\begin{bmatrix} \begin{bmatrix} \delta TA^t \\ \delta v_{eig}^{Nh} \\ \delta v^{Nz} \end{bmatrix} \\ \begin{bmatrix} \delta\phi \\ \delta\theta \\ \delta\psi \end{bmatrix} \end{bmatrix}\right)_{0,ff} \cdot \begin{bmatrix} J_{PIMC}^{vBx} \\ J_{PIMC}^{vBy} \\ J_{PIMC}^{vBz} \\ J_{PIMC}^{DA^t} \\ J_{PIMC}^{FPA^t} \\ J_{PIMC}^{vLx} \\ J_{PIMC}^{vLy} \end{bmatrix}^T.$$

Further, the method 300 may proceed at 310, where fault free and auxiliary terms for the derived integrity monitoring parameters may be calculated. In some implementations, the processor 116 may calculate the fault free and auxiliary terms for the derived integrity monitoring parameters as described above in FIG. 2.

By elevating certain derived integrity monitoring parameters into primary integrity monitoring parameters, such as the true track angle, the derived integrity monitoring parameters may be wholly derived from the primary integrity monitoring parameters.

Figure 4:
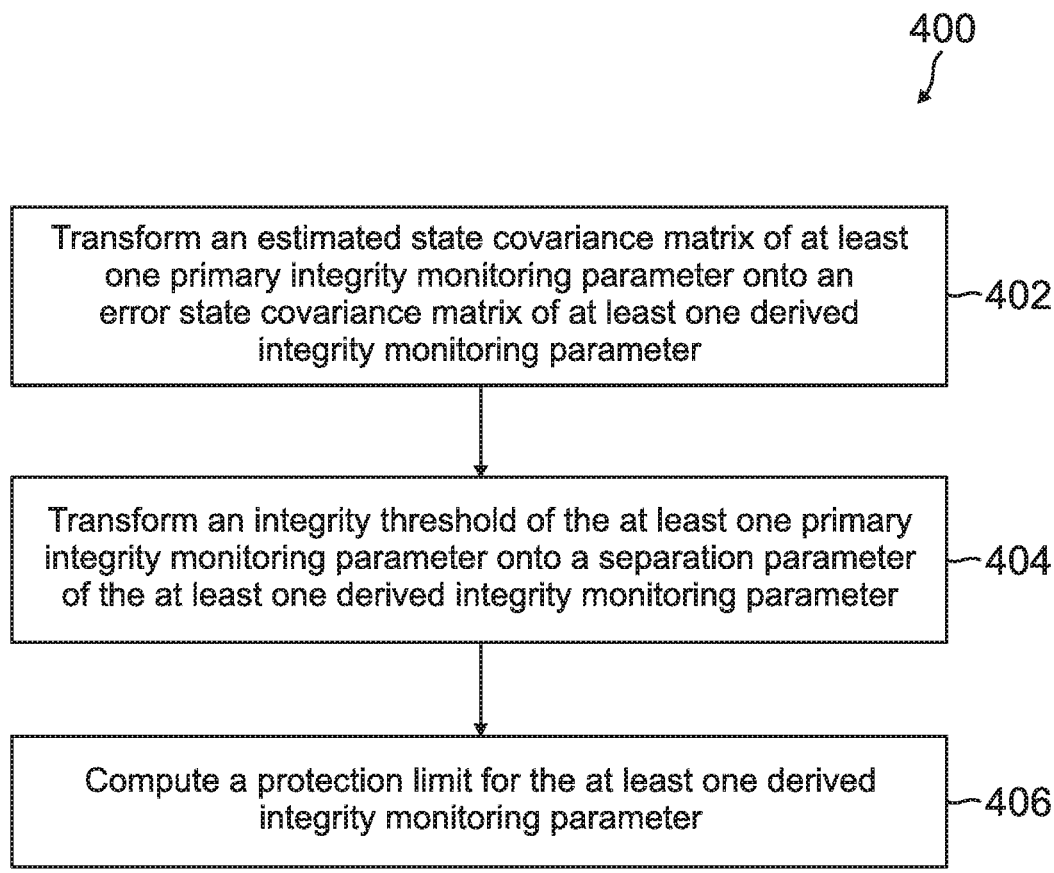
FIG. 4 is a flowchart diagram illustrating an additional exemplary method for integrity monitoring of primary and derived parameters according to an aspect of the present disclosure.

FIG. 4 is a flow diagram of an exemplary method 400 for calculating derived integrity monitoring parameters. In certain embodiments, the method 400 proceeds at 402, where an estimated state covariance matrix of at least one primary integrity monitoring parameter is transformed onto a covariance of at least one derived integrity monitoring parameter. Additionally, the method 400 proceeds at 404, where a threshold of the at least one primary integrity monitoring parameter is transformed onto a separation parameter of the at least one derived integrity monitoring parameter. Further, the method 400 proceeds at 406, where a protection limit is computed for the at least one derived integrity monitoring parameter.

Example Embodiments

Example 1 includes a method comprising: transforming an estimated error state covariance matrix of at least one primary integrity monitoring parameter of a navigation system onto an error state covariance matrix of one or more derived integrity monitoring parameters, wherein the one or more derived integrity monitoring parameters depends from the at least one primary integrity monitoring parameter; transforming an integrity threshold of the at least one primary integrity monitoring parameter onto separation parameters of the one or more derived integrity monitoring parameters; and computing a protection limit for the one or more derived integrity monitoring parameters.

Example 2 includes the method of Example 1, wherein the at least one primary integrity monitoring parameter comprise at least one of: a horizontal position; a vertical position; a horizontal velocity; a vertical velocity; a roll angle; a pitch angle; and a true heading angle.

Example 3 includes the method of any of Examples 1-2, wherein the one or more derived integrity monitoring parameters comprise: a body longitudinal velocity; a body lateral velocity; a body normal velocity; a drift angle; a flight path angle; an along heading velocity; and a cross heading velocity.

Example 4 includes the method of any of Examples 1-3, further comprising adopting at least one derived integrity monitoring parameter among the one or more derived integrity monitoring parameters as a primary integrity monitoring parameter.

Example 5 includes the method of Example 4, wherein adopting the at least one derived integrity monitoring parameter as a primary integrity monitoring parameter comprises transforming navigation parameters into a primary integrity monitoring parameters domain that includes the adopted primary integrity monitoring parameter.

Example 6 includes the method of any of Examples 4-5, wherein the adopted primary integrity monitoring parameters are true track angle and ground speed integrity monitoring parameters.

Example 7 includes the method of Example 6, wherein uncertainties related to the ground speed integrity monitoring parameter are transformed by a maximum eigenvector of horizontal velocity covariance, wherein the maximum eigenvector of horizontal velocity covariance is an uncertainty of a ground speed in a worst-case direction.

Example 8 includes a system comprising: a receiver configured to receive a plurality of signals transmitted from a plurality of transmitters; and a processor operatively coupled to the receiver, the processor configured to perform a method of integrity monitoring, wherein the integrity monitoring performed by the processor comprises: calculating one or more primary integrity monitoring parameters based on the plurality of signals; and deriving one or more derived integrity monitoring parameters from the one or more primary integrity monitoring parameters; transforming an estimated error state covariance of the one or more primary integrity monitoring parameters of a navigation system onto an error state covariance of the one or more derived integrity monitoring parameters; transforming an integrity threshold of the one or more primary integrity monitoring parameters onto separation parameters of the one or more derived integrity monitoring parameters; and computing a protection limit for the one or more derived integrity monitoring parameter.

Example 9 includes the system of Example 8, wherein the one or more primary integrity monitoring parameters comprise at least one of: a horizontal position; a vertical position; a horizontal velocity; a vertical velocity; a roll angle; a pitch angle; and a true heading angle.

Example 10 includes the system of any of Examples 8-9, wherein the one or more derived integrity monitoring parameters comprise: a body longitudinal velocity; a body lateral velocity; a body normal velocity; a drift angle; a flight path angle; an along heading velocity; and a cross heading velocity.

Example 11 includes the system of any of Examples 8-10, further comprising adopting at least one derived integrity monitoring parameter among the one or more derived integrity monitoring parameters as a primary integrity monitoring parameter.

Example 12 includes the system of Example 11, wherein adopting the at least one derived integrity monitoring parameter as a primary integrity monitoring parameter comprises transforming navigation parameters into a primary integrity monitoring parameters domain that includes the adopted primary integrity monitoring parameter.

Example 13 includes the system of any of Examples 11-12, wherein the adopted primary integrity monitoring parameters are true track angle and ground speed integrity monitoring parameters.

Example 14 includes the system of Example 13, wherein uncertainties related to the ground speed integrity monitoring parameter are transformed by a maximum eigenvector of horizontal velocity covariance, wherein the maximum eigenvector of horizontal velocity covariance is an uncertainty of a ground speed in a worst-case direction.

Example 15 includes a method comprising: receiving a plurality of pseudorange measurements from a plurality of satellites; calculating one or more primary integrity monitoring parameters based on the plurality of signals; and deriving one or more derived integrity monitoring parameters from the one or more primary integrity monitoring parameters, by: transforming an estimated error state covariance of the one or more primary integrity monitoring parameters of a navigation system onto an error state covariance of the one or more derived integrity monitoring parameters, wherein the one or more derived integrity monitoring parameters depends from the one or more primary integrity monitoring parameters; transforming an integrity threshold of the one or more primary integrity monitoring parameters onto separation parameters of the one or more derived integrity monitoring parameters; and computing a protection limit for the one or more derived integrity monitoring parameters.

Example 16 includes the method of Example 15, further comprising adopting at least one derived integrity monitoring parameter among the one or more derived integrity monitoring parameters as a primary integrity monitoring parameter.

Example 17 includes the method of Example 16, wherein adopting the derived integrity monitoring parameter as a primary integrity monitoring parameter comprises transforming the navigation parameters into a primary integrity monitoring parameters domain that includes the adopted primary integrity monitoring parameter.

Example 18 includes the method of any of Examples 16-17, wherein the adopted primary integrity monitoring parameters are true track angle and ground speed integrity monitoring parameters.

Example 19 includes the method of any of Examples 15-18, wherein the one or more primary integrity monitoring parameters comprise at least one of: a horizontal position; a vertical position; a horizontal velocity; a vertical velocity; a roll angle; a pitch angle; and a true heading angle.

Example 20 includes the method of any of Examples 15-19, wherein the one or more derived integrity monitoring parameters comprise: a body longitudinal velocity; a body lateral velocity; a body normal velocity; a drift angle; a flight path angle; an along heading velocity; and a cross heading velocity.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method comprising:
  receiving a plurality of signals transmitted from a plurality of transmitters;
  calculating one or more primary integrity monitoring parameters based on the plurality of signals; and
  deriving one or more derived integrity monitoring parameters from the one or more primary integrity monitoring parameters, wherein deriving the one or more derived integrity monitoring parameters comprises:
    transforming an estimated error state covariance matrix of at least one primary integrity monitoring parameter of a navigation system onto an error state covariance matrix of the one or more derived integrity monitoring parameters by multiplying the estimated error state covariance matrix of the at least one primary integrity monitoring parameter by a Jacobian for the one or more derived integrity monitoring parameters, wherein the one or more derived integrity monitoring parameters depends from the at least one primary integrity monitoring parameter;

transforming an integrity threshold of the at least one primary integrity monitoring parameter onto separation parameters of the one or more derived integrity monitoring parameters by multiplying the integrity threshold of the at least one primary integrity monitoring parameter by the Jacobian for the one or more derived integrity monitoring parameters; and computing a protection limit for the one or more derived integrity monitoring parameters by identifying a larger of a fault free protection limit and a largest combination of the separation parameters and auxiliary terms for sub solution of the one or more derived integrity monitoring parameter.

2. The method of claim 1, wherein the at least one primary integrity monitoring parameter comprise at least one of:
a horizontal position;
a vertical position;
a horizontal velocity;
a vertical velocity;
a roll angle;
a pitch angle; and
a true heading angle.

3. The method of claim 1, wherein the one or more derived integrity monitoring parameters comprise:
a body longitudinal velocity;
a body lateral velocity;
a body normal velocity;
a drift angle;
a flight path angle;
an along heading velocity; and
a cross heading velocity.

4. The method of claim 1, further comprising adopting at least one derived integrity monitoring parameter among the one or more derived integrity monitoring parameters as a primary integrity monitoring parameter, wherein adopting the at least one derived integrity monitoring parameter as the primary integrity monitoring parameter comprises transforming navigation parameters into a primary integrity parameters domain that includes the adopted primary integrity monitoring parameter.

5. The method of claim 4, wherein the adopted primary integrity monitoring parameters are true track angle and ground speed integrity monitoring parameters.

6. The method of claim 5, wherein uncertainties related to the ground speed integrity monitoring parameter are transformed by a maximum eigenvector of horizontal velocity covariance, wherein the maximum eigenvector of the horizontal velocity covariance is an uncertainty of a ground speed in a worst-case direction, wherein uncertainty in the worst-case direction determines the ground speed protection limit.

7. A system comprising:
a receiver configured to receive a plurality of signals transmitted from a plurality of transmitters; and
a processor operatively coupled to the receiver, the processor configured to perform a method of integrity monitoring, wherein the integrity monitoring performed by the processor comprises:
calculating one or more primary integrity monitoring parameters based on the plurality of signals; and
deriving one or more derived integrity monitoring parameters from the one or more primary integrity monitoring parameters, wherein deriving the one or more integrity monitoring parameters comprises:
transforming an estimated error state covariance of the one or more primary integrity monitoring parameters of a navigation system onto an error state covariance of the one or more derived integrity monitoring parameters by multiplying an estimated error state covariance matrix of the one or more primary integrity monitoring parameters by a Jacobian for the one or more derived integrity monitoring parameters;

transforming an integrity threshold of the one or more primary integrity monitoring parameters onto separation parameters of the one or more derived integrity monitoring parameters by multiplying the integrity threshold of the one or more primary integrity monitoring parameters by the Jacobian for the one or more derived integrity monitoring parameters; and computing a protection limit for the one or more derived integrity monitoring parameter by identifying a larger of a fault free protection limit and a largest combination of the separation parameters and auxiliary terms for sub solution of the one or more derived integrity monitoring parameter.

8. The system of claim 7, wherein the one or more primary integrity monitoring parameters comprise at least one of:
a horizontal position;
a vertical position;
a horizontal velocity;
a vertical velocity;
a roll angle;
a pitch angle; and
a true heading angle.

9. The system of claim 7, wherein the one or more derived integrity monitoring parameters comprise:
a body longitudinal velocity;
a body lateral velocity;
a body normal velocity;
a drift angle;
a flight path angle;
an along heading velocity; and
a cross heading velocity.

10. The system of claim 7, further comprising adopting at least one derived integrity monitoring parameter among the one or more derived integrity monitoring parameters as a primary integrity monitoring parameter, wherein adopting the at least one derived integrity monitoring parameter as the primary integrity monitoring parameter comprises transforming navigation parameters into a primary integrity monitoring parameters domain that includes the adopted primary integrity monitoring parameter.

11. The system of claim 10, wherein the adopted primary integrity monitoring parameters are true track angle and ground speed integrity monitoring parameters.

12. The system of claim 11, wherein uncertainties related to the ground speed integrity monitoring parameter are transformed by a maximum eigenvector of horizontal velocity covariance, wherein the maximum eigenvector of the horizontal velocity covariance is an uncertainty of a ground speed in a worst-case direction, wherein uncertainty in a worst-case direction determines the protection limit for the ground speed.

13. A method comprising:
receiving a plurality of pseudorange measurements from a plurality of satellites;

calculating one or more primary integrity monitoring parameters based on the plurality of pseudorange measurements using a solution separation methodology; and deriving one or more derived integrity monitoring parameters from the one or more primary integrity monitoring parameters, by:

transforming an estimated error state covariance of the one or more primary integrity monitoring parameters of a navigation system onto an error state covariance of the one or more derived integrity monitoring parameters by multiplying an estimated error state covariance matrix of the one or more primary integrity monitoring parameters by a Jacobian for the one or more derived integrity monitoring parameters, wherein the one or more derived integrity monitoring parameters depends from the one or more primary integrity monitoring parameters;

transforming an integrity threshold of the one or more primary integrity monitoring parameters onto separation parameters of the one or more derived integrity monitoring parameters by multiplying the integrity threshold of the one or more primary integrity monitoring parameters by the Jacobian for the one or more derived integrity monitoring parameters; and computing a protection limit for the one or more derived integrity monitoring parameters by identifying a larger of a fault free protection limit and a largest combination of the separation parameters and auxiliary terms for sub solution of the one or more derived integrity monitoring parameter.

14. The method of claim 13, further comprising adopting at least one derived integrity monitoring parameter among the one or more derived integrity monitoring parameters as a primary integrity monitoring parameter, wherein adopting the derived integrity monitoring parameter as the primary integrity monitoring parameter comprises transforming the navigation parameters into a primary integrity monitoring parameters domain that includes the adopted primary integrity monitoring parameter.

15. The method of claim 14, wherein adopting the derived integrity monitoring parameter as the primary integrity monitoring parameter comprises transforming the navigation parameters into a primary integrity monitoring parameters domain that includes the adopted primary integrity monitoring parameter.

16. The method of claim 14, wherein the adopted primary integrity monitoring parameters are true track angle and ground speed integrity monitoring parameters.

17. The method of claim 13, wherein the one or more primary integrity monitoring parameters comprise at least one of:
    a horizontal position;
    a vertical position;
    a horizontal velocity;
    a vertical velocity;
    a roll angle;
    a pitch angle; and
    a true heading angle.

18. The method of claim 13, wherein the one or more derived integrity monitoring parameters comprise:
    a body longitudinal velocity;
    a body lateral velocity;
    a body normal velocity;
    a drift angle;
    a flight path angle;
    an along heading velocity; and
    a cross heading velocity.

* * * * *